(No Model.)
E. E. KERL.
COLLAR FASTENER.
No. 512,974. Patented Jan. 16, 1894.
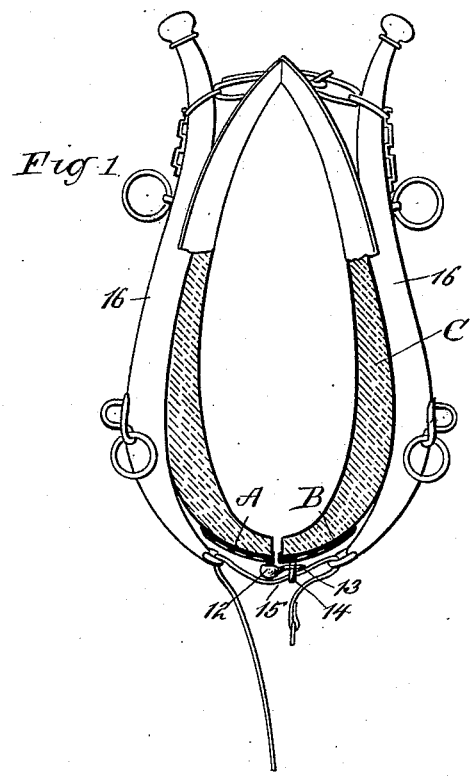
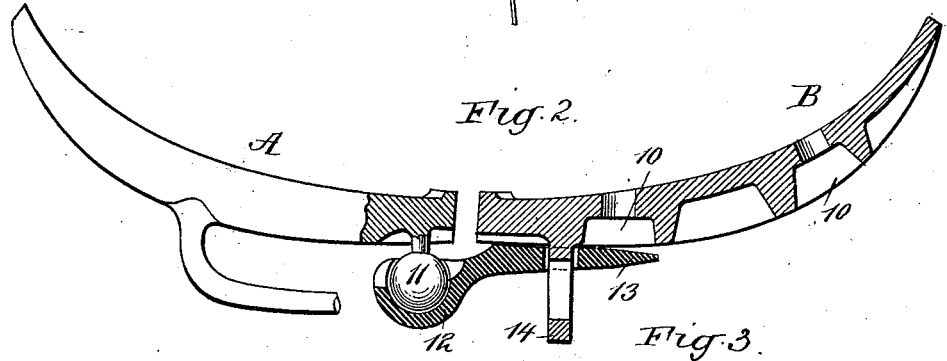
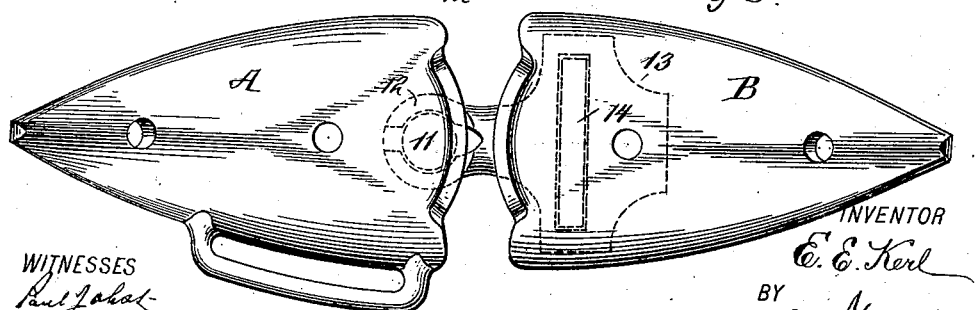
WITNESSES
Paul Johot
C. Sedgwick
INVENTOR
E. E. Kerl
BY
Munn & Co
ATTORNEYS.

UNITED STATES PATENT OFFICE.

ERNEST E. KERL, OF MELLETTE, SOUTH DAKOTA.

COLLAR-FASTENER.

SPECIFICATION forming part of Letters Patent No. 512,974, dated January 16, 1894.

Application filed September 7, 1893. Serial No. 484,968. (No model.)

*To all whom it may concern:*

Be it known that I, ERNEST E. KERL, of Mellette, in the county of Spink and State of South Dakota, have invented a new and Improved Horse-Collar Fastener, of which the following is a full, clear, and exact description.

My invention relates to a horse collar fastener, and it has for its object to provide a device by means of which sections of the horse collar may be united in an expeditious and convenient manner, and whereby the fastener will consist of rigid members adapted to be attached to the sections of the collar, the members of the fastener having a ball and socket connection, whereby the collar will be permitted to work in a free and easy manner upon the horse's shoulders, and whereby also the collar may move in unison with the movement of the shoulders and thus prevent the shoulders and upper portion of the neck from being galled, or scarred by the action of the collar.

Another feature of the invention is to so construct the fastening device that it will enable the collar to be placed upon the animal's neck in a convenient and expeditious manner.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a partial side elevation and partial vertical section of a horse collar and hames, illustrating the application to the collar of the improved fastening device. Fig. 2 is a side elevation of the fastening device, a portion thereof being in section; and Fig. 3 is an inner face view of the device.

In carrying out the invention the fastener is made in two sections, designated as A and B. The upper faces of each section, or those faces adapted for engagement with the collar C, are concaved; in fact they are shaped to receive the lower end of the collar, as a section is adapted to be located at each side of the lower central portion of the collar, the collar being divided at the said lower central portion, as shown in Fig. 1. The sections are therefore more or less curved longitudinally, and they are secured to the collar by means of bolts or their equivalents, and when bolts are employed, compartments 10, are formed in the lower or outer faces of the sections adapted to receive either the heads of the bolts, or the nuts employed in connection therewith. One section, the section A, for example, is provided with a ball 11, formed upon its under or outer face near the inner end of the section, and this ball is loosely mounted in a socket 12, the socket having integral therewith a hasp 13, the hasp being adapted to extend beyond the inner end of the section. The opposite fastener section B, is provided with a staple 14, extending at right angles from its under or outer face near its inner end, as shown in Fig. 2. The two sections of the fastener having been secured to the collar after the collar has been adjusted in position upon the neck, and this may be accomplished by separating the lower ends of the collar as far as may be desired, the staple 14 of one section is passed through the hasp 13 of the other section, and the two sections are held in locking engagement by passing through the staple and in engagement with the outer surface of the hasp the connecting strap 15 of the hames 16, as shown in Fig. 1.

It is evident that since there is a ball and socket connection between the two sections of the fastening device, and further that as the lower end of the collar is divided, that the collar will be enabled to move in perfect unison with the movement of the animal's shoulders and neck, and thus the injurious wearing action so common to collars of the ordinary construction will be avoided, and entirely obviated.

Having thus described my invention, I claim as new and desire to secure by Letters Patent—

1. The combination with horse-collar sections, having, respectively, a ball and staple projecting from their lower ends, and a hasp having a socket and slot for loose engagement with said ball and staple, substantially as shown and described.

2. The combination, with a horse collar divided at one of its ends, of a fastening device consisting of two sections secured to the collar, one at each side of its division, a keeper formed upon one section, and a hasp having a ball and socket connection with the other section, the hasp being adapted to be carried over the keeper, as and for the purpose specified.

ERNEST E. KERL.

Witnesses:
JOHN KYLLINGSTAD,
EUGENE WATERBURY.